(12) United States Patent
Li et al.

(10) Patent No.: US 8,645,799 B2
(45) Date of Patent: Feb. 4, 2014

(54) STORAGE CODES FOR DATA RECOVERY

(75) Inventors: Jin Li, Sammamish, WA (US); Viveck Cadambe, Irvine, CA (US); Cheng Huang, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 388 days.

(21) Appl. No.: 12/983,225

(22) Filed: Dec. 31, 2010

(65) Prior Publication Data

US 2012/0173932 A1 Jul. 5, 2012

(51) Int. Cl.
*G11C 29/00* (2006.01)

(52) U.S. Cl.
USPC .......................................................... 714/770

(58) Field of Classification Search
USPC ................................ 714/6.2, 6.22, 6.24, 770
See application file for complete search history.

(56) References Cited

U.S. PATENT DOCUMENTS

| | | | |
|---|---|---|---|
| 7,073,115 B2 | 7/2006 | English et al. | |
| 7,203,892 B2 | 4/2007 | Corbett et al. | |
| 7,321,905 B2 | 1/2008 | Hartline et al. | |
| 7,363,346 B2 * | 4/2008 | Groner et al. | 709/214 |
| 7,418,620 B1 * | 8/2008 | Tormasov et al. | 714/6.24 |
| 7,640,484 B2 | 12/2009 | Corbett et al. | |
| 7,681,104 B1 | 3/2010 | Sim-Tang et al. | |
| 8,392,805 B2 * | 3/2013 | Wylie et al. | 714/777 |
| 2008/0016435 A1 | 1/2008 | Goel | |
| 2008/0313241 A1 | 12/2008 | Li et al. | |
| 2009/0217139 A1 * | 8/2009 | Roh et al. | 714/783 |
| 2010/0180153 A1 * | 7/2010 | Jernigan et al. | 714/6 |

OTHER PUBLICATIONS

Huang, et al., "STAR : An Efficient Coding Scheme for Correcting Triple Storage Node Failures", Retrieved at <<http://research.microsoft.com/en-us/um/people/chengh/papers/star-TC08.pdf>>, IEEE Transactions on Computers, vol. 57, No. 7, Jul. 2008, pp. 889-901.

Greenan, et al., "Flat XOR-based erasure codes in storage systems: Constructions, efficient recovery, and tradeoffs", Retrieved at <<http://storageconference.org/2010/Papers/MSST/Greenan.pdf>>, IEEE 26th Symposium on Mass Storage Systems and Technologies, May 3-7, 2010, pp. 14.

Luo, et al., "SCAN: An Efficient Sector Failure Recovery Algorithm for RAID-6 Codes", Retrieved at <<http://nisl.wayne.edu/Papers/Tech/SCAN.pdf>>, Apr. 19, 2008, pp. 1-17.

"Advanced Data Protection Technology—Much More Reliable than RAID", Retrieved at <<http://www.permabit.com/products/rain-ec.asp>>, Retrieved Date: Oct. 6, 2010, pp. 3.

Shah, et al., "Explicit codes minimizing repair bandwidth for distributed storage", Retrieved at http://ieeexplore.ieee.org/stamp/stamp.jsp?arnumber=05503165>>, IEEE Information Theory Workshop, Jan. 6-8, 2010, pp. 5.

(Continued)

*Primary Examiner* — Scott Baderman
*Assistant Examiner* — Joseph Kudirka

(57) ABSTRACT

A random permutation code is described which provides efficient repair of data nodes. A specific implementation of a permutation code is also described, followed by description of a MISER-Permutation code. Finally, an optimal repair strategy is explained that involves an iterative process of downloading the most effective available parity data, updating costs of remaining parity data, and repeating until the data is recovered.

14 Claims, 11 Drawing Sheets

(56) References Cited

OTHER PUBLICATIONS

Wu, et al., "Reducing repair traffic for erasure coding-based storage via interference alignment", Retrieved at <<http://ieeexplore.ieee.org/stamp/stamp.jsp?arnumber=05205898>>, IEEE International Symposium on Information Theory, Jun. 28, 2009-Jul. 3, 2009, pp. 2276-2280.

Dimakis, et al., "Network coding for distributed storage systems", Retrieved at <<http://ieeexplore.ieee.org/stamp/stamp.jsp?tp=&arnumber=4215814>>, 26th IEEE International Conference on Computer Communications, May 6-12, 2007, pp. 2000-2008.

Suh, et al., "Exact regeneration codes for distributed storage repair using interference alignment", Retrieved at <<http://arxiv.org/pdf/1001.0107>>, Apr. 19, 2010, pp. 1-35.

Xiang, et al., "Optimal recovery of single disk failure in RDP code storage systems", Retrieved at <<http://www.cse.cuhk.edu.hk/~cslui/PUBLICATION/sigmetrics_2010.pdf>>, Proceedings of the ACM SIGMETRICS international conference on Measurement and modeling of computer systems, Jun. 14-18, 2010, pp. 12.

Wang, et al., "Rebuilding for Array Codes in Distributed Storage Systems", Retrieved at <<http://paradise.caltech.edu/etr.html>>, In Proceeding of CoRR, 2010, pp. 7.

* cited by examiner

|  | 1 disk fails | n-k disks fail |
|---|---|---|
| (4,2) Repetition | read 1 unit | not possible |
| (4,2) MDS codes | read 2 units | read 2 units |
| (n,k) MDS codes | read k units | read k units |

200

| |
|---|
| $\lambda_{4,1}a_1((0,0,0)) + \lambda_{4,2}a_2((0,0,0)) + \lambda_{4,3}a_3((0,0,0))$ |
| $\lambda_{4,1}a_1((0,0,1)) + \lambda_{4,2}a_2((0,0,1)) + \lambda_{4,3}a_3((0,0,1))$ |
| $\lambda_{4,1}a_1((0,1,0)) + \lambda_{4,2}a_2((0,1,0)) + \lambda_{4,3}a_3((0,1,0))$ |
| $\lambda_{4,1}a_1((0,1,1)) + \lambda_{4,2}a_2((0,1,1)) + \lambda_{4,3}a_3((0,1,1))$ |
| $\lambda_{4,1}a_1((1,0,0)) + \lambda_{4,2}a_2((1,0,0)) + \lambda_{4,3}a_3((1,0,0))$ |
| $\lambda_{4,1}a_1((1,0,1)) + \lambda_{4,2}a_2((1,0,1)) + \lambda_{4,3}a_3((1,0,1))$ |
| $\lambda_{4,1}a_1((1,1,0)) + \lambda_{4,2}a_2((1,1,0)) + \lambda_{4,3}a_3((1,1,0))$ |
| $\lambda_{4,1}a_1((1,1,1)) + \lambda_{4,2}a_2((1,1,1)) + \lambda_{4,3}a_3((1,1,1))$ |

Node 4

202

| |
|---|
| $\lambda_{5,1}a_1((1,0,0)) + \lambda_{5,2}a_2((0,1,0)) + \lambda_{5,3}a_3((0,0,1))$ |
| $\lambda_{5,1}a_1((1,0,1)) + \lambda_{5,2}a_2((0,1,1)) + \lambda_{5,3}a_3((0,0,0))$ |
| $\lambda_{5,1}a_1((1,1,0)) + \lambda_{5,2}a_2((0,0,0)) + \lambda_{5,3}a_3((0,1,1))$ |
| $\lambda_{5,1}a_1((1,1,1)) + \lambda_{5,2}a_2((0,0,1)) + \lambda_{5,3}a_3((0,1,0))$ |
| $\lambda_{5,1}a_1((0,0,0)) + \lambda_{5,2}a_2((1,1,0)) + \lambda_{5,3}a_3((1,0,1))$ |
| $\lambda_{5,1}a_1((0,0,1)) + \lambda_{5,2}a_2((1,1,1)) + \lambda_{5,3}a_3((1,0,0))$ |
| $\lambda_{5,1}a_1((0,1,0)) + \lambda_{5,2}a_2((1,0,0)) + \lambda_{5,3}a_3((1,1,1))$ |
| $\lambda_{5,1}a_1((0,1,1)) + \lambda_{5,2}a_2((1,0,1)) + \lambda_{5,3}a_3((1,1,0))$ |

Node 5

FIG. 8

STORAGE CODES FOR DATA RECOVERY

BACKGROUND

In the field of data storage, data recovery can be accomplished by encoding stored data into parity data, and using the parity data to recover the stored data, should some of the stored data be lost. FIG. 1 shows an arrangement for an (n,k) MDS (maximum distance separable) code. A storage controller 100 encodes data disks 102 into parity disks 104. The storage controller 100 may implement any of a variety of (n,k) type MDS codes, where k is the number of data nodes (e.g., data disk 102), n is the total number of nodes (parity nodes and data nodes), and n−k is the number of parity nodes. In the example of FIG. 1, n=5 and k=2. When a page of data 106 is requested to be read, the storage controller 100 may obtain corresponding data from one or more data disks 102. When a page of data 106 is requested to be written, the storage controller 100 both writes data to one or more data disks 102, and computes parity data that is written to the parity disks 104. The parity data may be computed from both the page of data 106 as well as from data already stored in the data disks 102. Significantly, if a data disk 102 fails, one or more of the remaining data disks 102 and parity disks 104 are used to recover the lost data that was on the data disk 104.

FIG. 2 shows a generic (4,2) coding arrangement. The same arrangement might be used whether the code is a Repetition code, an MDS code, or another type of code. Storage units are maintained, namely, data disk 102 units and parity disk 104 units. Depending on which coding scheme is used, one or more units are read to reconstruct a lost data unit. If a (4,2) Repetition code is used, any one other disk can be read to reconstruct a lost disk. With a (4,2) MDS code, any two units will be read to reconstruct the lost data. Generally, for any (n,k) MDS code, k units need to be read to reconstruct a single lost disk. Many codes are designed to handle failure of multiple storage units. However, the overhead necessary to handle perhaps rare multiple concurrent failures may both increase the total amount of parity data needed as well as add to the cost of reconstruction when only a single storage unit fails.

Described below are coding techniques that are efficient when it is assumed that one data node or storage unit fails. Described also is a technique for finding an optimal repair strategy for any given code.

SUMMARY

The following summary is included only to introduce some concepts discussed in the Detailed Description below. This summary is not comprehensive and is not intended to delineate the scope of the claimed subject matter, which is set forth by the claims presented at the end.

Embodiments described herein relate to coding, reconstruction, and repair efficiency. An overview of coding and repair is provided, followed by an illustrative example. A random permutation code is described which provides efficient repair of data nodes; a general implementation and a specific (5,3) implementation are described. An optimal repair strategy is explained that involves an iterative process of downloading the most effective available parity data, updating costs of remaining parity data, and repeating until the data is recovered. Finally, an efficient MISER-Permutation code is explained.

Many of the attendant features will be explained below with reference to the following detailed description considered in connection with the accompanying drawings.

BRIEF DESCRIPTION OF THE DRAWINGS

The present description will be better understood from the following detailed description read in light of the accompanying drawings, wherein like reference numerals are used to designate like parts in the accompanying description.

FIG. 8 shows parity nodes.

DETAILED DESCRIPTION

Coding Overview and Example

Embodiments discussed below relate to coding, reconstruction, and repair efficiency. A general approach for improved parity computation is discussed, followed by a detailed example. A technique for optimal code repair is then described.

Figure 1:
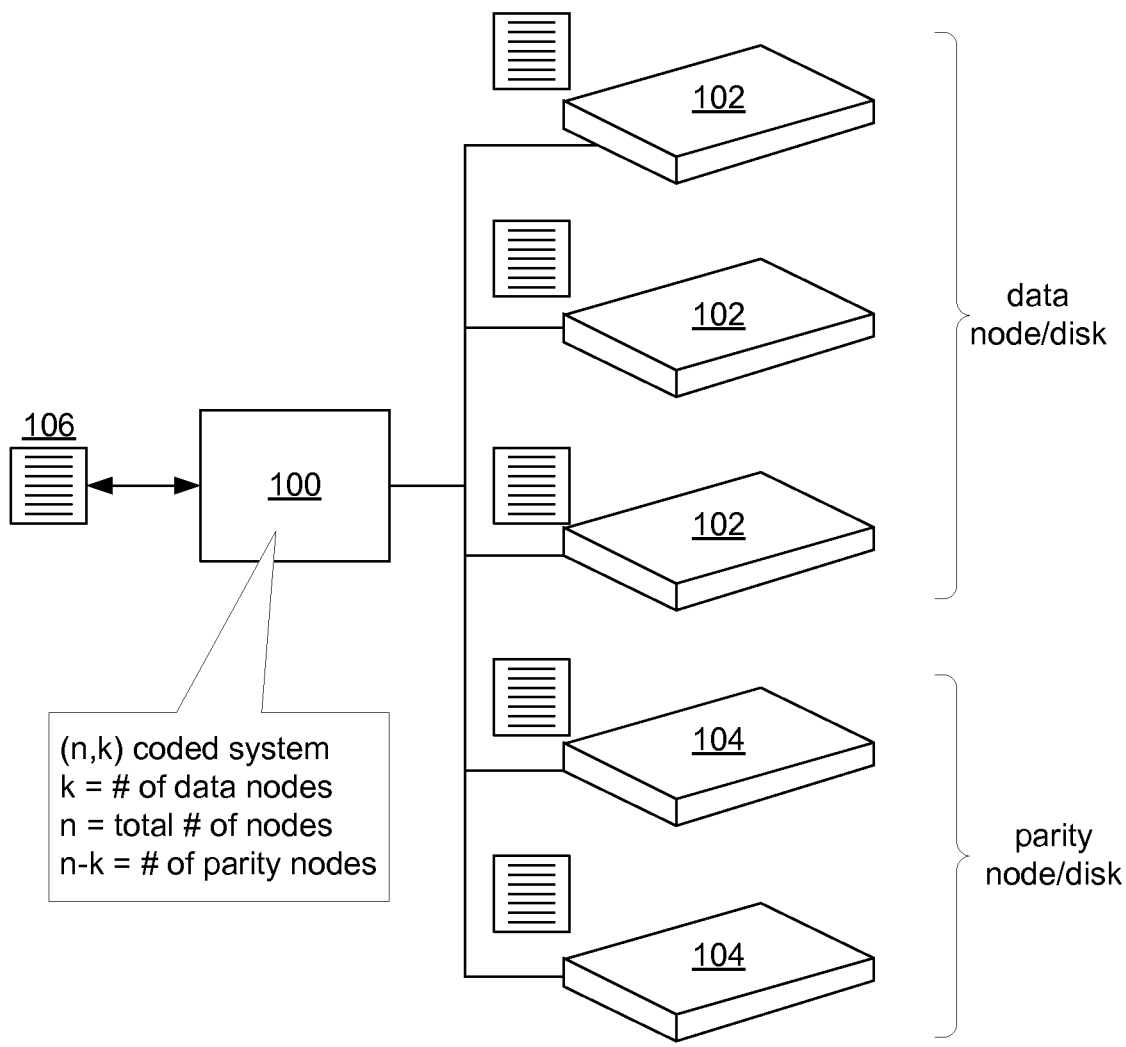
FIG. 1 shows an arrangement for an (n,k) MDS (maximum distance separable) code.
Figure 2:
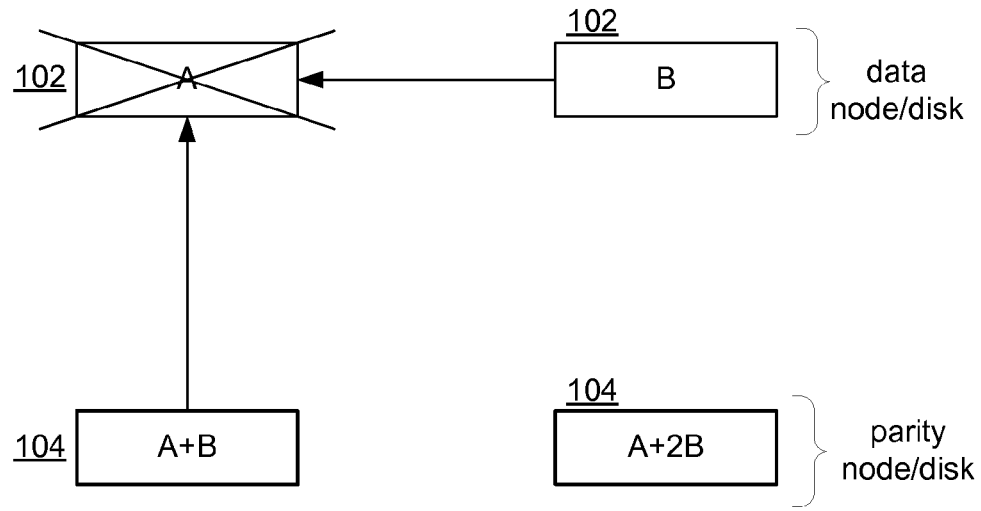
FIG. 2 shows a generic (4,2) coding arrangement.

While the codes listed in FIG. 2 and others may or may not be capable of recovering more than one lost disk, many codes are designed to meet that scenario. However, in some cases the probability of losing two disks at the same time is remote. Nonetheless, the code being used might not be efficient at one-disk recovery, possibly because of the information needed to cover the loss of more than one disk at a time. Described next are codes for single node failure that can recover a lost data node using information (parity and non-parity data) only 2.5 times the amount of the lost data node.

Figure 3:
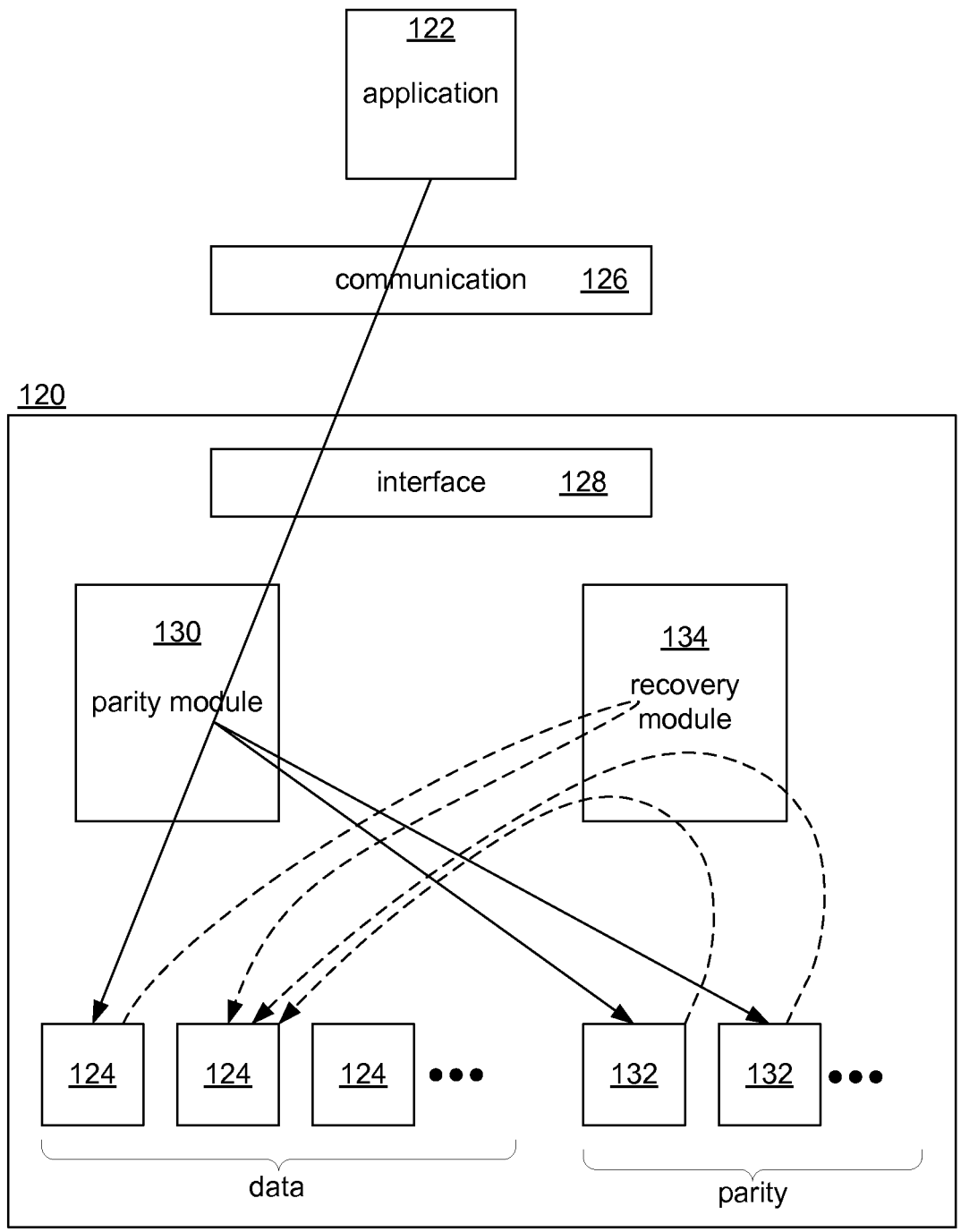
FIG. 3 shows a storage system that maintains and provides access to data.

FIG. 3 shows a storage system 120 that maintains and provides access to data. The storage system 120 provides any arbitrary application 122 with access to data stored in data storage units 124. The application 122 writes data to the storage system 120, which may be passed by a communication medium 126 such as a local bus, a data network, etc. An interface 128 of the storage system 120 handles communications with the application 122. When a write is received from the application 122, a parity module 130 transparently computes parity data for the new data (possibly by also reading data from a data storage unit 124), and stores the parity data in one or more parity storage units 132. As illustrated by the dashed lines in FIG. 3, when a data storage unit 124 becomes unavailable, for example, unintentionally due to failure or intentionally for administrative needs, a recovery module 134 reads parity storage units 132 and one or more data storage units 124, to reconstruct the data of the unavailable data storage unit 124. It should be noted that the storage system 120 is only an example. The coding techniques described herein may be used in any type of storage system. For example, the techniques may be used in a single-host bus-based disk mirroring system (for example, in a disk controller), in a cloud data storage service, in the file system software of an operating system, in a database management system's storage subsystem, and so on.

As used herein, a "node" or "storage unit" is any unit of storage. For example, a node or storage unit can be a physical disk drive, a logical disk drive comprised of multiple physical disk drives, a network storage device, a file, a non-volatile memory device, etc. A node may also be any sub-part of one of these types of devices, although generally nodes are units delineated by system administration and management; a node or storage unit may be a unit or device by which data is managed, for example, a node or storage unit may be added to a storage system, taken offline, replicated, replaced, etc. A "parity node", or "parity storage unit", or the like will refer to a unit of physical storage storing parity data, as might be computed by parity module 130 using any of a variety of techniques described herein. A "data node" or "data storage unit" or the like will refer to a unit of physical storage storing non-parity data, for example, data used by application 122.

Figure 4:
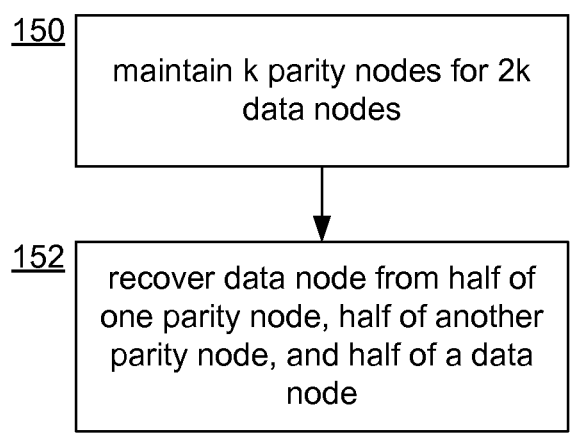
FIG. 4 shows a coding scheme.

FIG. 4 shows a coding scheme. It will be assumed that, at step 150, a storage system like that of FIG. 3 maintains parity nodes and data nodes. As will be explained, 2 units of non-parity data can be stored for every 1 unit of parity data, and only 2.5 units of parity and non-parity data total need to be read to reconstruct 1 unit of lost non-parity data. The storage system can be based on any of a variety of known storage systems that maintain data nodes and maintain parity nodes on-the-fly from the current state of the data nodes. That is, as a data node is updated with new data, the storage system automatically computes parity data from the new data and correspondingly updates one or more parity nodes to store the parity data. When a data node becomes unavailable, for example for maintenance or due to a fault, the storage system automatically (or after administrator intervention) begins to reconstruct the data of the lost data node using the parity nodes. In the scheme of FIG. 3, at step 122, a data node is recovered using only half of one parity node, half of another parity node, and half of a data node that is paired with the unavailable data node.

Figure 5:
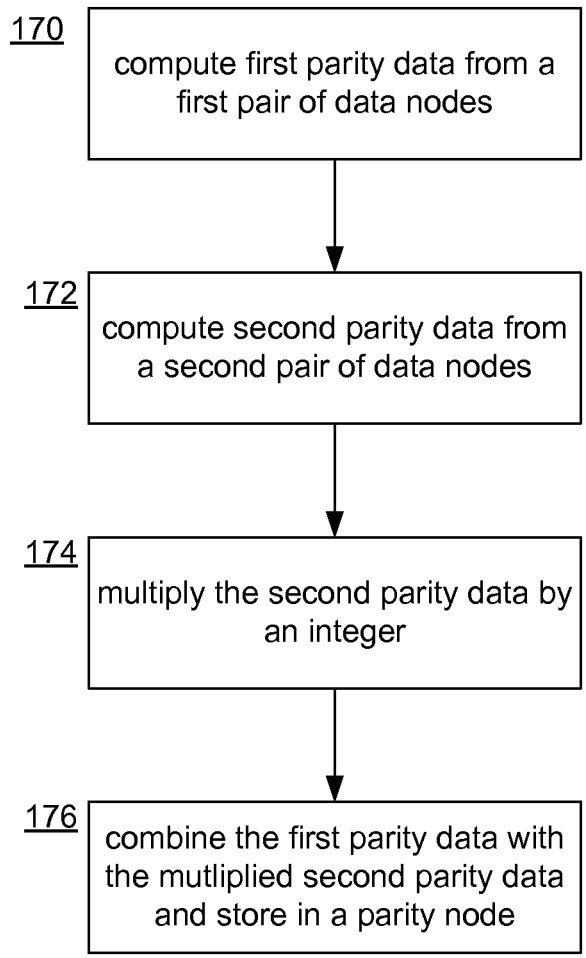
FIG. 5 shows a detailed coding scheme.

FIG. 5 shows a more detailed coding scheme. At step 170, when parity is to be computed, for instance when new data is received or when a new data node comes online, a first set of parity data is computed from a first pair of data nodes. At step 172, a second set of parity data is computed from a second pair of data nodes. Generally, the parity data for a pair of data nodes may be computed by exclusive-or operations on fragments or portions of the data nodes. At step 174, one of the sets of parity data, for instance, the second set of parity data, is multiplied by an integer. At step 176 the two sets of parity data are combined and stored in a parity node. At the end, the parity node is storing parity data derived from at least four different data nodes. Note that the first and second sets of parity data may be computed using an existing (4,2) code or two different existing (4,2) codes. Note also that in other embodiments (6,3) codes or codes with other rates may be used.

Figure 6:
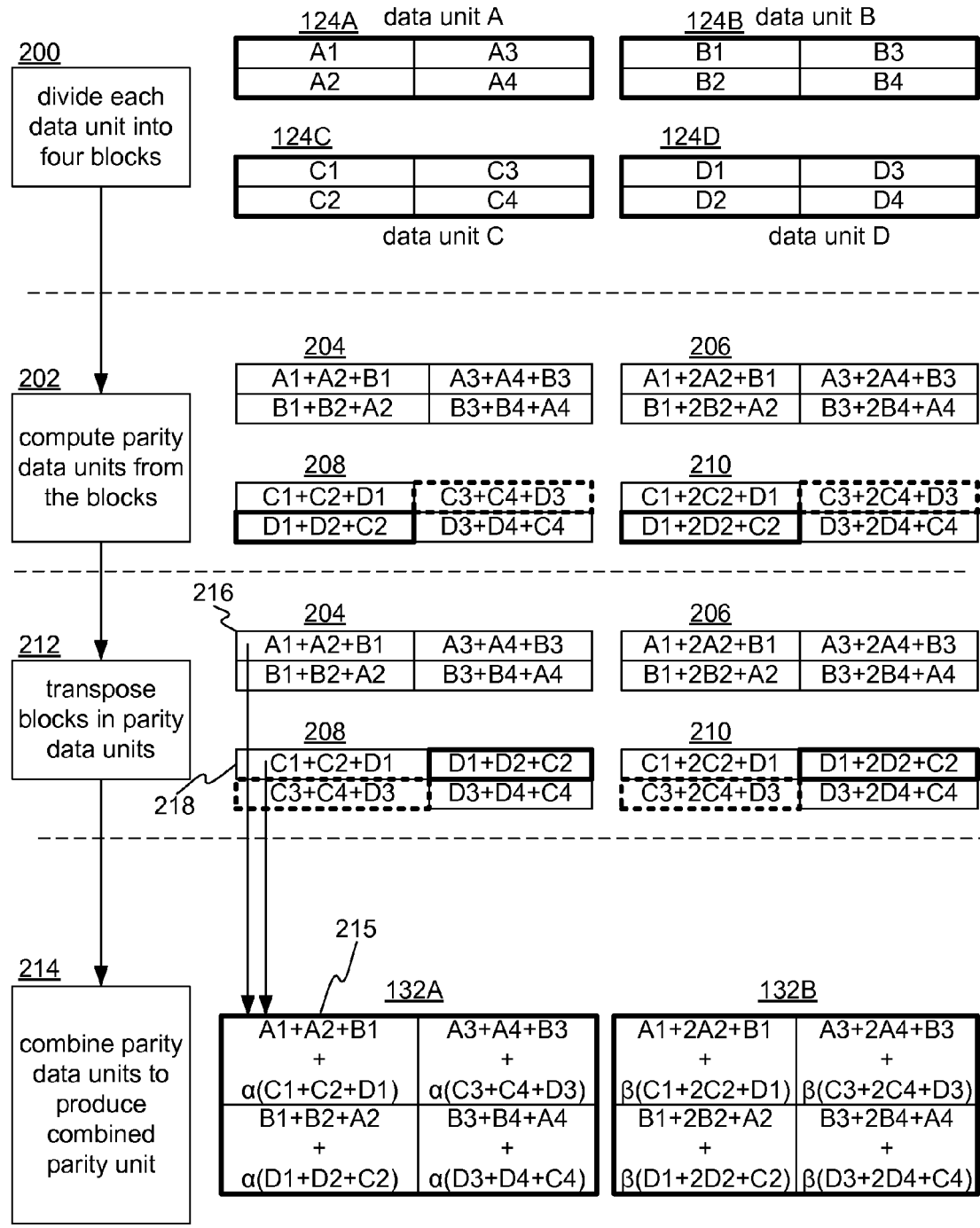
FIG. 6 shows a coding scheme that combines two (4,2) codes.

FIG. 6 shows a coding scheme that combines two (4,2) codes. In the example of FIG. 6, it will be assumed that six data storage units of equal size will be used; four data storage units 124A, 124B, 124C, and 124D (data units A, B, C, and D) and two parity storage units 132A and 132B. It will also be assumed that each storage unit (124A-124B, 132A, 132B) is divided into equal-sized portions or fragments (the small blocks in FIG. 6, e.g., "A1", "A1+2A2+B1", etc.). A portion or fragment may be a block, a word or byte, a page, an entire quarter of a storage unit, etc. In the example of FIG. 6, the portions are labeled according to their data storage unit, for example, data unit A (either the entire data unit or a block thereof) is divided into portions A1, A2, A3, and A4. Thus, at step 200, each data unit A, B, C, and D is divided into four corresponding portions (note that the dividing may be an implicit part of the parity computing process).

At step 202, parity data is computed from the blocks or portions of the data units. The parity data may include first parity data 204, second parity data 206 (both computed from data units A and B), third parity data 208 and fourth parity data 210 (both computed from data units C and D). The parity data 204, 206, 208, and 210 may be computed using a known coding scheme, for example, a (4,2) MDS code. Moreover, the code used for the parity data 204 and second parity data 206 may be a different code from the code used to compute the third parity data 208 and the fourth parity data 210.

At step 212, blocks or portions of the parity data are logically transposed. The portions transposed in FIG. 6 are shown by dashed and solid lines. The "C3+C4+D3" parity portion is transposed with the "D1+D2+C2" parity portion, and the "C2+2C4+D3" parity portion is transposed with the "D1+2D2+C2" parity portion. Note that physical relocation of parity data is not required; the corresponding computations are simply designed to target the correct portions of parity data.

At step 214, the parity data units are combined to produce parity units 132A and 132B. First, the parity data 208 is multiplied by an integer $\alpha$, and the parity data 210 is multiplied by an integer $\beta$. The corresponding portions of the parity data units are then combined by exclusive-or operations. For example, a parity unit portion 215 may contain the result of an exclusive-or of parity portion 216 is and (multiplied) parity portion 218. As will be explained next, the any of the data storage units 124A, 124B, 124C, or 124D can be reconstructed using data from the remaining data storage units and from the parity storage units 132A and 132B.

Figure 7:
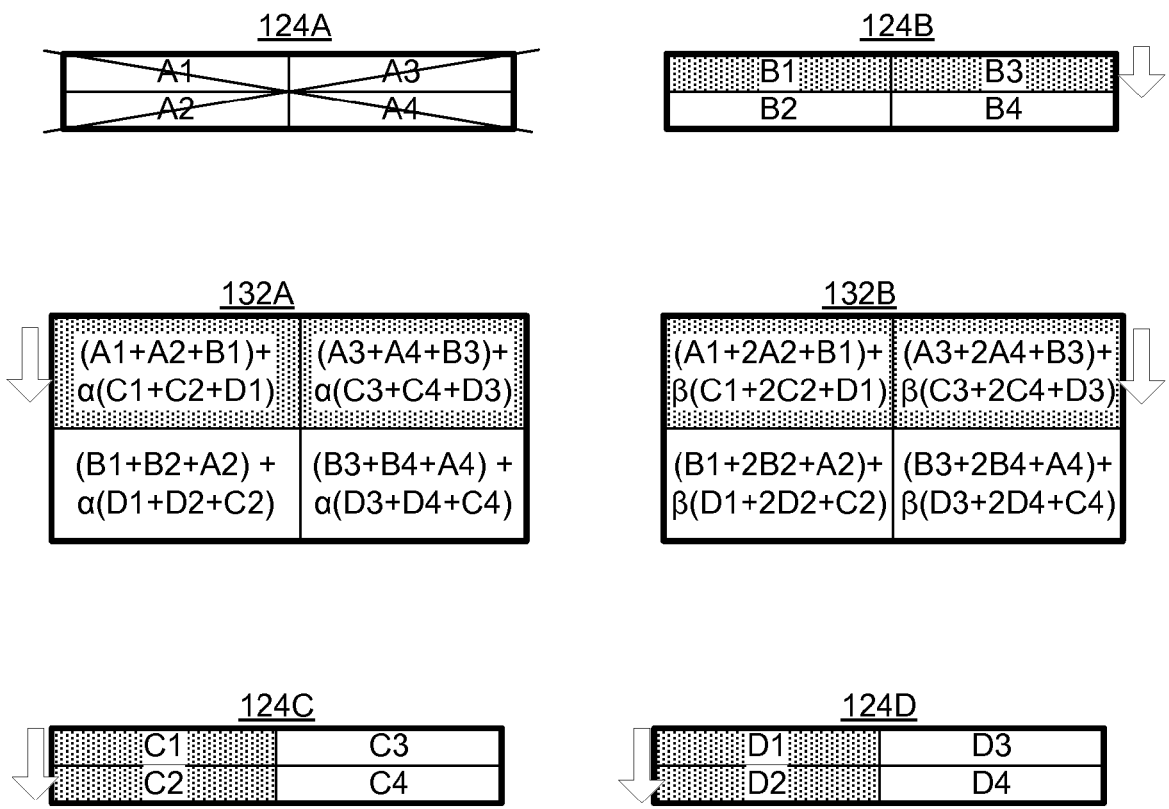
FIG. 7 shows an example data recovery corresponding to FIG. 6.

FIG. 7 shows an example data recovery corresponding to FIG. 6. In this example, only 2.5 units of data (1 unit of parity and 1.5 units of non-parity data) are needed to recover 1 lost unit of data. For example, if that 1 unit of data is data storage unit 124A, which for some reason becomes unavailable, a recovery module reads only two halves of parity storage units 132A and 132B (shaded), respectively and three halves (shaded) of data storage units 124B, 124C, and 124D, respectively. Again, the specific portions read for reconstruction are shown in FIG. 7 with shading. If data stored in data storage unit 124A is to be reconstructed, a reconstruction process will read: half of parity unit 132A (containing the results of (A1+A2+B1)+$\alpha$(C1+C2+D1) and of (A3+A4+B3)+$\alpha$(C3+C4+D3)), half of parity unit 132B (containing the results of (A1+2A2+B1)+$\beta$(C1+2C2+D1) and of (A3+2A4+B3)+$\beta$(C3+2C4+D3)), half of data storage unit 124B (B1 and B3), half of data storage unit 124C (C1 and C2), and half of data storage unit 124D (D1 and D2). The actual data (A1, A2, A3, and A4) is reconstructed using ordinary linear algebra techniques according to the used codes and the values used for $\alpha$ and $\beta$.

Because the technique discussed above can be extended to larger numbers of parity units, the code may be referred to as a (3k,2k) code, which may operate on $k^2$ fragments of non-parity data in a data storage unit. Compared to a (6,4) MDS code, 40% less recovery data (parity and non-parity data) is needed to recover a data storage unit. Compared to a (9,6) code, 50% less recovery data needs to be read for recovery.

Permutation Codes

The following "Overview and Nomenclature" section describes nomenclature used in the next section; "General Permutation Codes".

Overview and Nomenclature

Consider the following model. Assume k sources, all of equal size $\mathcal{L}=m/k$ over a field $\mathbb{F}_q$ of size q. Note that here m denotes the size of the total data stored in the distributed storage system, in terms of the number of elements over the field. Source $i \in \{1, 2, \ldots, k\}$ is represented by the $\mathcal{L} \times 1$ vector $a_i \in \mathbb{F}_q^{\mathcal{L}}$. There are n data nodes storing a code of the k source symbols in an (n,k) MDS code. Each node stores a data of size $\mathcal{L}$, i.e., each coded symbol of the (n,k) code is a $\mathcal{L} \times 1$ vector. The data stored in node i is represented by $\mathcal{L} \times 1$ vector $d_i$. It will be assumed that the code is linear and $d_i$ can be represented as $$d_i = \sum_{j=1}^{k} c_{i,j} a_j,$$

where $C_{i,j}$ are $\mathcal{L} \times \mathcal{L}$ square matrices. Further, the codes are restricted to have a systematic structure, so that, for $i \in \{1, 2, \ldots, k\}$, $$C_{i,j} = \begin{Bmatrix} I & j=i \\ 0 & j \neq i \end{Bmatrix}.$$

In view of the use of MDS codes, it will be assumed that the matrices $C_{i,j}$ satisfy the following property:

Property 1

$$\operatorname{rank}\left(\begin{bmatrix} C_{j_1,1} & C_{j_1,2} & \cdots & C_{j_1,k} \\ C_{j_2,1} & C_{j_2,2} & \cdots & C_{j_2,k} \\ \vdots & \vdots & \ddots & \vdots \\ C_{j_k,1} & C_{j_k,2} & \cdots & C_{j_k,k} \end{bmatrix}\right) = Lk = m \quad (1)$$

for any distinct $j_1, j_2, \ldots, j_k \in \{1, 2, \ldots, n\}$.

The MDS property ensures that the storage system can tolerate upto (n−k) failures (erasures), because all the sources can be reconstructed from any k nodes whose indices are represented by $j_1, j_2, \ldots, j_k \in \{1, 2, \ldots, n\}$. Consider the case where a single systematic node $i \in \{1, 2, \ldots, k\}$ fails. The goal is to reconstruct the failed node i, i.e., to reconstruct $d_i$ using all the other n−1 nodes, i.e., $\{d_j: j \neq 1\}$. To understand the solution, first, consider the case where node 1 fails. For optimality, it is desirable to download a fraction of $$\frac{1}{n-k}$$

of the data stored in each of the nodes 2, 3, ..., n. Focusing on linear repair solutions implies that there is a need to download $$\frac{\mathcal{L}}{n-k}$$

linear combinations from nodes $d_j, j=2, 3, \ldots, n$. Specifically, the linear combination downloaded from node $j \in \{2, 3, \ldots, n\}$ is denoted as $$V_{1,j} d_j = V_{1,j} \sum_{j=1}^{k} C_{i,j} a_j = \underbrace{V_{1,j} C_{i,1} a_1}_{\text{Desired signal component}} + \underbrace{V_{1,j} \sum_{j=2}^{j} C_{i,j} a_j}_{\text{Interference component}},$$

where $V_{1,j}$ is a $$\frac{\mathcal{L}}{n-k} \times \mathcal{L}$$

dimensional matrix.

The goal of the problem is to construct the $\mathcal{L}$ components of $a_i$ from the above equations. For systematic node $j \in \{2, 3, \ldots, k\}$, the equations downloaded by the new node do not contain information of the desired signal $a_1$, since for these nodes, $C_{j,1}=0$. The linear combinations downloaded from the remaining nodes $j \in \{k+1, k+2, \ldots, n\}$, however, contain components of both the desired signal and the interference. Thus, the downloaded linear combinations $V_{1,j} d_j$ are of the following two types.

1. The data downloaded from the surviving systematic nodes $i=2, \ldots, k$ contain no information of the desired signal $a_1$, i.e., $$V_{1,j} d_j = V_{1,j} a_j, j=1,2,\ldots,k.$$

Note that there $$\frac{\mathcal{L}}{n-k}$$

such linear combinations of each interfering component $a_j$, $j=2, 3, \ldots, k$.

2. The $\mathcal{L}$ components of the desired signal have to be reconstructed using the $$(n-k) \cdot \frac{\mathcal{L}}{n-k} = \mathcal{L}$$

linear combinations of the form $V_{1,j} d_j, j=k+1, k+2, \ldots, n$. Note that these linear combinations also contain the interference terms $a_j, j=2 \ldots, k$ which need to be cancelled.

The goal will be to completely cancel the interference from the second set of $\mathcal{L}$ combinations, using the former set of linear combinations, and then to regenerate $x_1$ using the latter $\mathcal{L}$ combinations. Consider the following characteristics of the solution.

While a general structure for a repair-bandwidth-optimal solution is defined above, the repair vectors satisfy a set of additional properties, which are denoted here for simplicity. In the solution, $$V_{l,j} = V_{l,j'}$$

for all $l \in \{1, 2, \ldots, k\}, j \neq j', j, j' \in \{1, 2, \ldots, n\}-\{l\}$. In other words, when some node l fails, the same linear combination is downloaded from every surviving node. The notation $$V_j \stackrel{\Delta}{=} V_{l,j}$$

is used for all $j \in \{1, 2, \ldots, n\}-\{l\}$. Further, the solution is not only repair-bandwidth-optimal, but it is also optimal in terms of disk access. In other words, for the solution, $V_j$ not only has a rank of L/(n−k), it also has exactly L/(n−k) non-zero columns—in fact, $V_j$ has exactly L/(n−k) non-zero entries. Among the L columns of $V_j$, $$L - \frac{L}{n-k}$$

columns are zero. Note the significance of this in terms of disk access—to obtain the linear combination $V_j d_i$ from node i for repair of node l≠i, only $$\frac{L}{n-k}$$

entries of the node i have to be accessed. Noting that the number of non-zero columns cannot be fewer than $$\frac{L}{n-k}$$

for a matrix of rank $$\frac{L}{n-k},$$

it can be observed that the solution is also optimal in terms of disk access.

General Permutation Codes

This section describes an arbitrary coding based construction of Permutation Codes which achieve the repair bandwidth lower bound of $$\frac{n-1}{n-k}$$

units for repair of systematic nodes of for any tuple (n,k) where n>k.

Notations and Definitions: Bold font will denote vectors and matrices and regular font will represent scalars. Given a l×1 dimensional vector a its l components are denoted by $$a = \begin{bmatrix} a(1) \\ a(2) \\ \vdots \\ a(l) \end{bmatrix}$$

For example, $d_1 = [d_1(1) d_1(2) d_1(\mathcal{L}) \ldots ]^T$. Given a set $\mathcal{A}$, the l-dimensional cartesian product of the set is denoted by $\mathcal{A}^l$. Finally, $I_l$ denotes the l×l identity matrix; the subscript l is dropped when the size l is clear from the context. Now, a set of functions is defined which will be useful in the description of permutation codes.

Given (n,k) and a number $m \in \{1, 2, \ldots, (n-k)^k\}$, a function $\vec{\phi}: \{1, 2, \ldots, (n-k)^k\} \rightarrow \{0, 1, \ldots, (n-k-1)\}^k$ is defined such that $\vec{\phi}(m)$ is the unique k dimensional vector whose k components represent the k-length representation of m−1 in base (n−k). In other words $$\vec{\phi}(m) = (r_1, r_2, \ldots, r_k) \Leftrightarrow m - 1 = \sum_{i=1}^{k} r_i (n-k)^{i-1},$$

where $r_i \in \{0, 1, \ldots, (n-k-1)\}$. Note that, since the k-length representation of a number in base (n−k) is unique, $\vec{\phi}$ and $\phi_i$ are well defined functions. Further, $\vec{\phi}$ is invertible and its inverse is denoted by $\phi^{-1}$. The following compressed notation will also be used for $\phi^{-1}$:

$$\langle r_1, r_2, \ldots, r_k \rangle \triangleq \phi^{-1}(r_1, r_2, \ldots, r_k) = \sum_{i=1}^{k} r_i (n-k)^{i-1} - 1$$

The definition of the above functions will be useful in constructing the codes.

Example n=5, k=3 Permutation-Code

To aid understanding of the generalized n, k case described below, consider the case where k=3, n=5; extension to arbitrary n, k will follow. In this code, $m/k = (n-k)^k = 2^3 = 8$. As the name suggests, generalized permutation matrices are used for $C_{i,j}, j \in \{1, 2, \ldots, k\}, i \in \{k+1, k+2, \ldots, n\}$. Note here that the variables $a_j, j=1, 2, \ldots, k$ are $(n-k)^k \times 1$ dimensional vectors. Represent the $(n-k)^k = 8$ components these vectors by the k=3 bit representation of their indices as $$a_j = (a_j(1) a_j(2) \ldots a_j(8))^T = \begin{pmatrix} a_j(\langle 0,0,0 \rangle) \\ a_j(\langle 0,0,1 \rangle) \\ a_j(\langle 0,1,0 \rangle) \\ a_j(\langle 1,0,0 \rangle) \\ a_j(\langle 1,0,1 \rangle) \\ a_j(\langle 1,1,0 \rangle) \\ a_j(\langle 1,1,1 \rangle) \end{pmatrix}$$

for all j=1, 2, ..., k. Now, similarly, denote the identity matrix as $$I_8 = \begin{bmatrix} e(1) \\ e(2) \\ \vdots \\ e(8) \end{bmatrix} = \begin{bmatrix} e(\langle 0,0,0 \rangle) \\ e(\langle 0,0,1 \rangle) \\ \vdots \\ e(\langle 1,1,1 \rangle) \end{bmatrix},$$

where naturally, e(i) is the ith row of the identity matrix. The code is described as follows.

Since the first three storage nodes are systematic nodes and the remaining two are parity nodes, the design parameters are $C_{4,j}, C_{5,j}, V_j$ for j=1, 2, 3. Choose $C_{4,j} = \lambda_{4,j} I$ so that $$d_4 = \sum_{j=1}^{4} \lambda_{4,j} a_j,$$

where $\lambda_{4,j}$ are independent random scalars chosen using a uniform distribution over the field $\mathbb{F}_q$.

Now, consider the 8×8 permutation matrix $P_i$ defined as $$P_1 = \begin{bmatrix} e(\langle 1,0,0\rangle) \\ e(\langle 1,0,1\rangle) \\ e(\langle 1,1,0\rangle) \\ e(\langle 1,1,1\rangle) \\ e(\langle 0,0,0\rangle) \\ e(\langle 0,0,1\rangle) \\ e(\langle 0,1,0\rangle) \\ e(\langle 0,1,1\rangle) \end{bmatrix}, P_2 = \begin{bmatrix} e(\langle 0,1,0\rangle) \\ e(\langle 0,1,1\rangle) \\ e(\langle 0,0,0\rangle) \\ e(\langle 0,0,1\rangle) \\ e(\langle 1,1,0\rangle) \\ e(\langle 1,1,1\rangle) \\ e(\langle 1,0,0\rangle) \\ e(\langle 1,0,1\rangle) \end{bmatrix}, P_3 = \begin{bmatrix} e(\langle 0,0,1\rangle) \\ e(\langle 0,0,0\rangle) \\ e(\langle 0,1,1\rangle) \\ e(\langle 0,1,0\rangle) \\ e(\langle 1,0,1\rangle) \\ e(\langle 1,0,0\rangle) \\ e(\langle 1,1,1\rangle) \\ e(\langle 1,1,0\rangle) \end{bmatrix}$$

Then, the fifth node (i.e., the second parity node) is designed as $$d_5 = \sum_{j=1}^{3} \lambda_{5,j} P_j a_j,$$

where $\lambda_{5,j}$ are random independent scalars drawn uniformly over the entries of the field $\mathbb{F}_q$. In other words, $C_{5,j}=P_j$ for $j=1, 2, 3$. For a better understanding of the structure of the permutations, consider a column $a=[a(1) a(2) \ldots a(8)]^T$. Note that a is an arbitrary $2^3 \times 1$ dimensional vector. Then, $$P_1 a = \begin{pmatrix} a(\langle 1,0,0\rangle) \\ a(\langle 1,0,1\rangle) \\ a(\langle 1,1,0\rangle) \\ a(\langle 0,0,0\rangle) \\ a(\langle 0,0,1\rangle) \\ a(\langle 0,1,0\rangle) \\ a(\langle 0,1,1\rangle) \end{pmatrix} = \begin{pmatrix} a(5) \\ a(6) \\ a(7) \\ a(1) \\ a(2) \\ a(3) \\ a(4) \end{pmatrix}$$

In other words, $P_1$ is a permutation of the components of a such that the element $a(\langle 1, x_2, x_3\rangle)$ is swapped with the element $a(\langle 0, x_2, x_3\rangle)$ for $x_2, x_3 \in \{0,1\}$. Similarly, $P_2$ swaps $a(\langle x_1, 0, x_3\rangle)$ and $a(\langle x_1, 1, x_3\rangle)$ and $P_3$ swaps $a(\langle x_1, x_2, 0\rangle)$ with $a(\langle x_1, x_2, 1\rangle)$. The code is depicted in FIG. 8, which shows two parity nodes; node 4 200 and node 5 202.

Now, it is shown that this code can be used to achieve optimal recovery, in terms of repair bandwidth, for a single failed systematic node. To see this, consider the case where node 1 fails. Note that for optimal repair, the new node has to download $$\frac{1}{n-k} = \frac{1}{2}$$

of every surviving node, i.e., nodes 2, 3, 4, 5. The repair strategy is to download $d_i(\langle 0,0,0\rangle)$, $d_i(\langle 0,0,1\rangle)$, $d_i(\langle 0,1,0\rangle)$, $d_i(\langle 0,1,1\rangle)$ from node $i \in \{2,3,4,5\}$, so that $$V_1 = \begin{bmatrix} e(\langle 0,0,0\rangle) \\ e(\langle 0,0,1\rangle) \\ e(\langle 0,1,0\rangle) \\ e(\langle 0,1,1\rangle) \end{bmatrix} = \begin{bmatrix} e(1) \\ e(2) \\ e(3) \\ e(4) \end{bmatrix}$$

Figure 9:
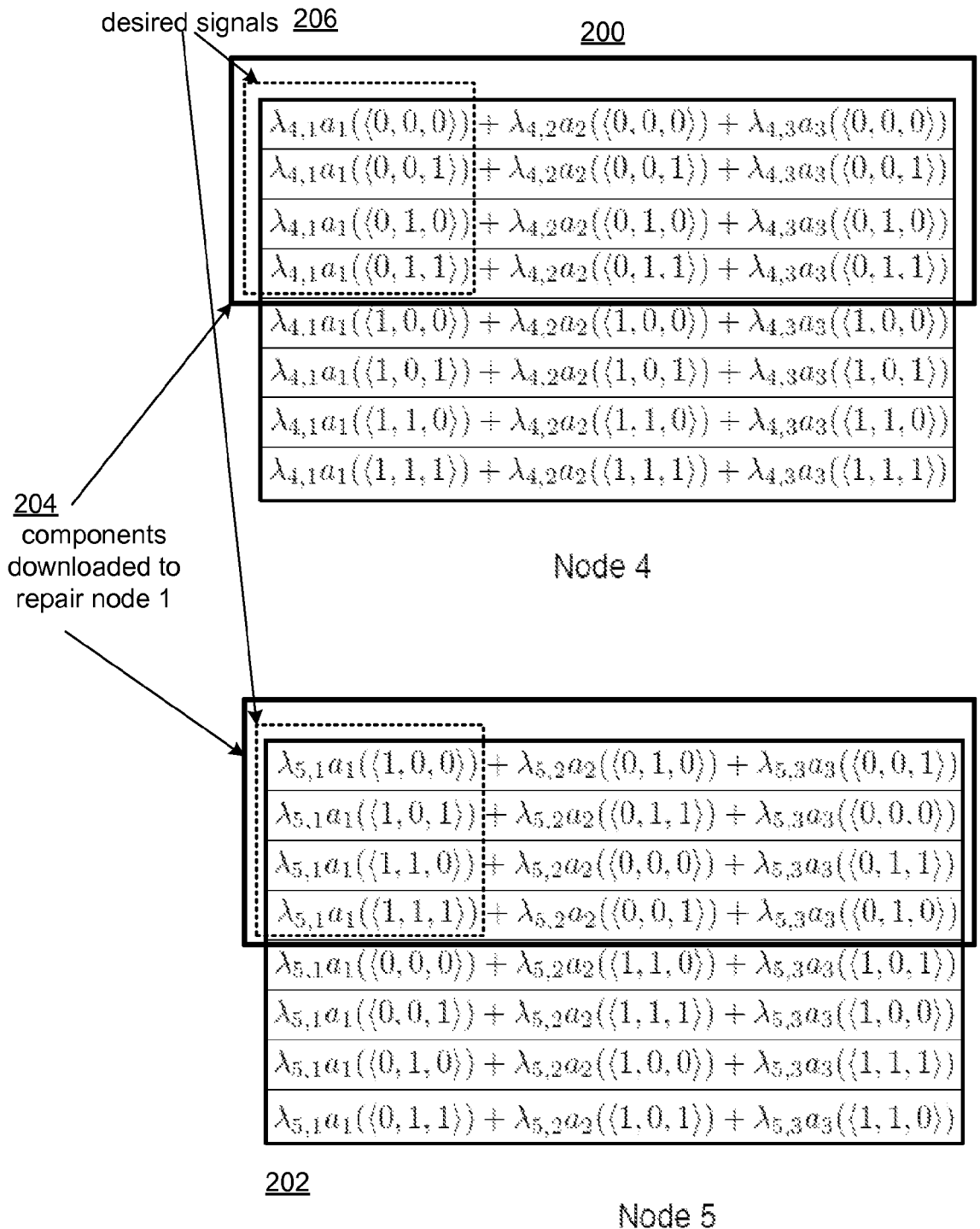
FIG. 9 shows downloaded portions of the parity nodes in FIG. 8.

In other words, the rows of $V_1$ come from the set $\{e(\langle 0, x_2, x_3\rangle): x_2, x_3 \in \{0,1\}\}$. Note that the strategy downloads half the data stored in every surviving node as required. With these download vectors, it can be observed (See FIG. 9) that the interference is aligned as required and all the 8 components of the desired signal $a_1$ can be reconstructed. As shown in FIG. 9, downloaded portions 204 used to recover failure of node 1 are indicated by solid line boxes. Note that the undesired symbols can be cancelled by downloading half the components of $a_2$, $a_3$, i.e., by downloading $a_2(\langle 0, x_1, x_2\rangle)$ and $a_3(\langle 0, x_1, x_2\rangle)$ for $x_1, x_2 \in \{0,1\}$. The canceling leaves desired signals 206, indicated by dashed line boxes.

It should also be noted that:

$$\text{rowspan}(V_1 C_{4,i}) = \text{rowspan}(V_1 C_{5,i}) = \text{span}(\{e(\langle 0, x_1, x\rangle): x_1, x_2 \in \{0,1\}\}) \quad (1)$$

In other words, because of the structure of the permutations, the downloaded components can be expressed as $$d_4(\langle 0, x_2, x_3\rangle) = \lambda_{4,1} a_1(\langle 0, x_2, x_3\rangle) + \lambda_{4,2} a_2(\langle 0, x_2, x_3\rangle) + \lambda_{4,3} a_3(\langle 0, x_2, x_3\rangle)$$

$$d_5(\langle 0, x_2, x_3\rangle) = \lambda_{5,1} a_1(\langle 1, x_2, x_3\rangle) + \lambda_{5,2} a_2(\langle 0, x_2 \oplus 1, x_3\rangle) + \lambda_{5,3} a_3(\langle 0, x_2, x_3 \oplus 1\rangle)$$

Because $x_2, x_3 \in \{0,1\}$, there are a total 8 components described in the two equations above, such that, all the interferers are of the form $a_i(0, y_2, y_3)$, $i \in \{2,3\}$, $y_2, y_3 \in \{0,1\}$. In other words, the interference from $a_i$, $i=2, 3$ comes from only half its components, and the interference is aligned as described in formula (1). However, note that the 8 components span all the 8 components of the desired signal $a_1$. Thus, the interference can be completely cancelled and the desired signal can be reconstructed.

Similarly, in case of failure of node 2, the set of rows of the repair vectors $V_{2,j}$ is equal to the set $\{e(\langle x_1, 0, x_2\rangle): x_1, x_2 \in \{0,1\}\}$, i.e., $$V_2 = \begin{bmatrix} e(\langle 0,0,0\rangle) \\ e(\langle 0,0,1\rangle) \\ e(\langle 1,0,0\rangle) \\ e(\langle 1,0,1\rangle) \end{bmatrix} = \begin{bmatrix} e(1) \\ e(2) \\ e(5) \\ e(6) \end{bmatrix}$$

With this set of download vectors, it can be noted that, for $i=1,3$ $$\text{rowspan}(V_2 C_{4,i}) = \text{rowspan}(V_2 C_{5,i}) = \text{span}(\{e(\langle x_1, 0, x_3\rangle): x_1, x_3 \in \{0,1\}\})$$

so that the interference is aligned. The rows of $V_{3,j}$ come from the set $\{e(\langle x_1, x_2, 0\rangle): x_1, x_2 \in \{0,1\}\}$. For this choice of $V_3$, alignment can be verified to be satisfied, for $i=1,2$, as $$\text{rowspan}(V_3 C_{4,i}) = \text{rowspan}(V_3 C_{5,i}) = \text{span}(\{e(\langle x_1, x_2, 0\rangle): x_1, x_2 \in \{0,1\}\})$$

This shows that optimal repair is achieved. It can be shown that the code is an MDS code (i.e., Property 1). Next, we proceed to show how to extend this construction and repair strategy to any (n,k), k<n.

General (n,k) Permutation Codes

As noted above, the (5,3) code can be extended to a general case of (n,k). To describe this generalization, define function $\vec{\chi}_i(m) = (\phi_1(m), \phi_2(m), \ldots, \phi_{i-1}(m), \phi_i(m) \oplus 1, \phi_{i+1}(m), \phi_{i+2}(m), \ldots, \phi_k(m))$, where the operator $\oplus$ represents an addition modulo (n−k). In other words, $\vec{\chi}_i(m)$ modifies the ith position in the base (n−k) representation of m−1, by addition of 1 modulo (n−k).

Remark 1 For the (5,3) Permutation Code described previously, note that the mth row of $P_i$ is $e(\langle \vec{\chi}_i(m)\rangle)$. In other words, the mth component of $P_i a$ is equal to $a(\langle \vec{\chi}_i(m)\rangle)$.

Remark 2 $\langle \vec{\chi}_i(1) \rangle, \langle \vec{\chi}_i^*(2) \rangle, \ldots, \langle \vec{\chi}_i^*((n-k)^k) \rangle$ is a permutation of $1, 2, \ldots, (n-k)^k$ for any $i \in \{1, 2, \ldots, k\}$. Therefore, given a $\mathcal{L} \times 1$ vector a, $$[a(\langle \vec{\chi}_i(1) \rangle), a(\langle \vec{\chi}_i(2) \rangle), \ldots, a(\langle \vec{\chi}_i((n-k)^k) \rangle)]^T$$

is a permutation of a. This permutation will be used to construct the code.

In this code, $\mathcal{L} = m/k = (n-k)^k$, so that the k sources, $a_1, a_2, \ldots, a_k$ are all $(n-k)^k \times 1$ vectors. The $(n-k)^k \times (n-k)^k$ dimensional coding matrices $C_{j,i}$ for $j \in \{1, 2, \ldots, n\}$, $i \in \{1, 2, \ldots, k\}$ are scaled permutation matrices. Consider the permutation matrix $P_i$ defined as $$P_i = \begin{pmatrix} e(\langle \vec{\chi}_i(1) \rangle) \\ e(\langle \vec{\chi}_i(2) \rangle) \\ \vdots \\ e(\langle \vec{\chi}_i((n-k)^k) \rangle) \end{pmatrix}$$

where $e(1), e(2), \ldots, e((n-k)^k)$ are the rows of the identity matrix $I_{(n-k)^k}$. Note that because of Remark 2, the above matrix is indeed a permutation matrix. Then, the coding matrices are defined as $$C_{j,i} = \lambda_{j,i} P_j^{i-k-1}.$$

Thus, to understand the structure of the above permutation, consider an arbitrary column vector $a = (a(1) a(2) \ldots a((n-k)^k))^T$. Then, let $j = \langle x_1, x_2, x_3, \ldots, x_k \rangle$ for $1 \leq j \leq (n-k)^k$. Then, the jth component of $P_i a$ is $$a(\langle (x_1, x_2, \ldots, x_{i-1}, x_i \oplus 1, x_{i+1}, \ldots, x_k) \rangle).$$

Thus, $$d_{k+r+1}(\langle x_1, x_2, \ldots, x_k \rangle) = \lambda_{k+r+1,1} a_1(x_1 \oplus r, x_2, x_3, \ldots, x_k) + \lambda_{k+r+1,2} a_2(x_1, x_2 \oplus r, x_3, \ldots, x_k) + \ldots + \lambda_{k+r+1,k} a_k(x_1, x_2, x_3, \ldots, x_k \oplus r)$$

where $r \in \{0, 1, 2, \ldots, n-k-1\}$. Now, in case of failure of node 1, the rows of the repair vectors $V_l$ are chosen from the set $\{e(m): \phi_l(m) = 0\}$. Note that this construction has $\mathcal{L} k = (n-k)^{k-1}$ rows for $V_l$ as required. Because of the construction, we have the following interference alignment relation for $i \neq l$, $j \in \{k+1, k+2, \ldots, n\}$ rowspan$(C_{j,i} V_l)$ = rowspan$(\{e(m): \phi_l(m) = 0\})$.

Further, rowspan$(C_{j,l} V_l)$ = rowspan$(\{e(m): \phi_l(m) = j-k-1\})$.

for $j \in \{k+1, k+2, \ldots, n\}$ so that the desired signal can be reconstructed from the interference. It can be shown that the code has the MDS property. Also, colspan $(C_{j,l} V_{j,l})$ = colspan $(\{e(m): \phi_l(m) = 0\})$, whereas colspan$(C_{j,i} V_{j,i})$ = $(\{e(m): \phi_i(m) = 0\})$.

Reduced Cost Repair Strategy

Figure 10:
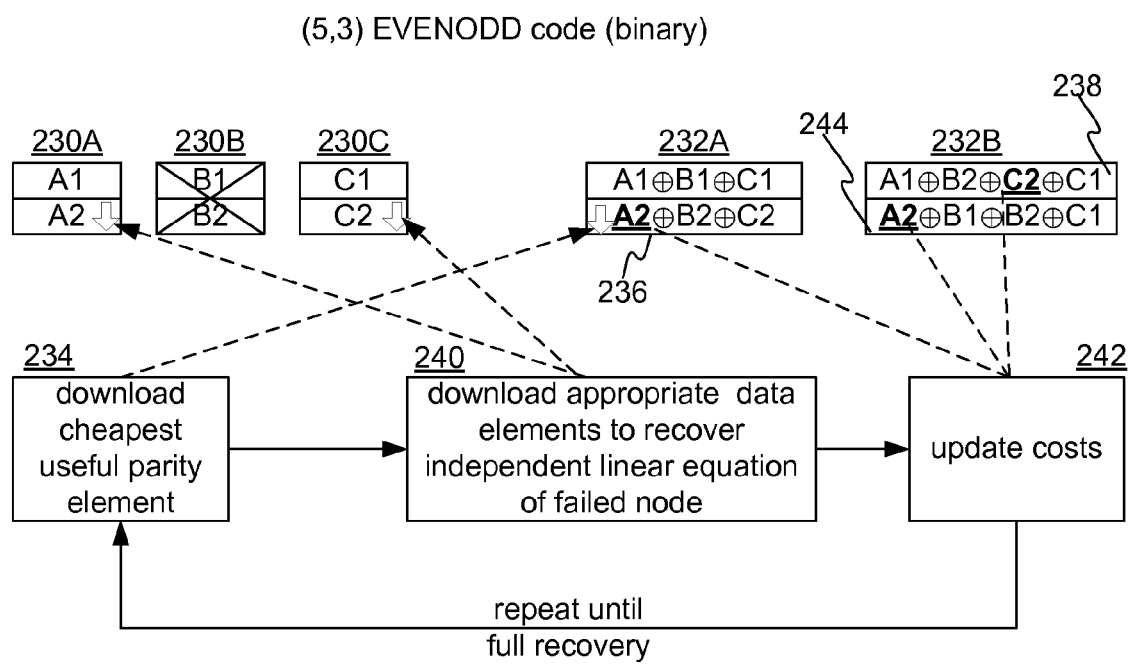
FIG. 10 shows a method for repairing an existing code.

FIG. 10 shows a method for repairing an existing code. The technique will be described with reference to a (5,3) EVENODD code, but is not limited to this type of code. Initially, data storage nodes 230A, 230B, and 230C store data that is encoded in parity storage nodes 232A and 232B. Assuming that data storage node 232B becomes unavailable, the technique begins by, at step 234, downloading a cheapest useful parity element (portion of a parity storage node). In the example, parity element 236 is identified based on its having the most useful independent linear equation for the target data storage node—data storage node 230B. The costs of parity elements are based on the number of undesired data elements. For example, parity element 236 has only two undesired data elements (A2 and C2), whereas parity element 238 has three undesired data elements (A1, C2, and C1). Here, undesired data elements are those data elements that are not data from the target data storage node that is being recovered.

At step 240, appropriate data elements are downloaded to recover independent linear equation of the target storage node. In this example, data elements A2 and C2 are downloaded. At step 242 the costs of the remaining parity data elements are updated according to the data elements that have been downloaded. That is, data elements that correspond to downloaded data are no longer included in a cost count. Thus, for data element 244 (for which A2 and C1 were originally cost elements), A2, having been downloaded, is eliminated and the cost for data element 244 is now just one (for C1). The process is repeated until the target data storage node is fully recovered. Consequently, C1 is downloaded, as well as data element 244. Note that the repeating may occur until there are a sufficient number of linear combinations of downloaded data elements.

In one embodiment, rather than computing cost of a parity element as a number of undesired data elements, the cost is computed by downloading a parity element and recovering an independent linear equation. The costs are updated accordingly. Then, a greedy heuristic is run to download the remaining parity elements.

MISER Permutation Code

Code described next relate to efficient repair of Permutation Code parity nodes in the special case of n=1.5k. Specifically described are alternate MDS code constructions, to be referred to as MISER-Permutation codes, which also achieve the optimal repair bandwidth of $$\frac{n-1}{n-k}$$

units for repair of systematic nodes, when n=1.5k. Furthermore, unlike Permutation Codes, the MISER-Permutation Codes also provide relatively efficient repair of parity nodes, with a repair bandwidth of $$k/2 + \frac{n-k/2-1}{n-3k/2}$$

units, which is less than k.

Notation

Vectors are denoted by bold font. Given an m×1 vector a, the m components of a are denoted as $a(1), a(2), \ldots, a(m)$. Furthermore, $a(n_1:n_2)$ denotes the vector $$\begin{pmatrix} a(n_1) \\ a(n_1+1) \\ \vdots \\ a(n_2) \end{pmatrix}$$

where $1 \leq n_1 < n_2 \leq m$.

Background-MISER Codes

The MISER-Permutation Code combines two component codes such that the combined code has efficient repair properties. Any two $(2\tilde{k}, \tilde{k})$ components codes can be combined if each underlying component code satisfies the following properties: (i) the data stored in each code symbol can be divided into $\tilde{k}$ equal parts; and (ii) for repair of the mth (systematic) node (where $m \in \{1, 2, \ldots, \tilde{k}\}$), download the mth part from each of the remaining surviving n−1 nodes (the ordering of the $\tilde{k}$ parts stored in a code element is not important, and the mth part represents just any unique part of the code symbol downloaded when the mth node fails, whereas $\tilde{k}-1$ parts can be excluded from downloading when any other systematic node fails).

Although any component code satisfying the above properties (i) and (ii) can be used, this explanation assumes that the MISER code is used, which does satisfy these properties.

Formation of the Code

The new $(3\tilde{k}, 2\tilde{k})$ code is formed by combining two underlying $(2\tilde{k}, \tilde{k})$ codes. To denote that code, it will be assumed that the data fragments can be represented as $x_1, x_2, \ldots, x_{2\tilde{k}}$. The $(n-k)=\tilde{k}$ parity fragments to be formed are represented as $p_1, p_2, \ldots, p_{\tilde{k}}$. In this new code, all the vectors $x_i$ and $p_i$ are $\tilde{k}^2 \times 1$ dimensional vectors. In other words, each of the 3k fragments of this new code are divided into $\tilde{k}^2$ parts. Gow the parity vectors $p_i$ are designed for $i=1, 2, \ldots, \tilde{k}$ will be explained next.

Code Expansion

In a first step, two virtual/hypothetical sets of parity components are formed. The first set of parity components is denoted as $p_i^{[1]}$, $i=1, 2 \ldots, \tilde{k}$, and the second set of parity components is denoted as $p_i^{[2]}$, $i=1, 2, \ldots, \tilde{k}$. The first set of parity components form, essentially an expanded MISER code over $x_1, x_2, \ldots x_{\tilde{k}}$. That is, $p_1(1:\tilde{k}), p_2(1:\tilde{k}), \ldots p_{\tilde{k}}^{[1]}(1:\tilde{k})$ form a MISER code using $x_1(1:k), \ldots, x_{\tilde{k}}(1:k)$. In general, parity elements $p_i^{[1]}((a\tilde{k}+1): (a+1)\tilde{k})$ are similarly formed using $x_1((a\tilde{k}+1): (a+1)\tilde{k}), \ldots, x_{\tilde{k}}((a\tilde{k}+1): (a+1)\tilde{k})$, where $a=0, 1, \ldots \tilde{k}-1$.

In a similar manner the second set of parity nodes $p_i^{[2]}$, $i=1, 2 \ldots, \tilde{k}$ form an expanded MISER code over $x_{\tilde{k}+1}, \ldots x_{2\tilde{k}\tilde{k}}$.

Code Combinations—Permutation and Linear Combination

The actual MISER-Permutation code is formed by combining the underlying expanded MISER codes as described above. Specifically, the $\tilde{k}^2$ components of parity node $p_i$ are formed as $$p_i((a-1)\tilde{k}+b) = p_i^{[1]}((a-1)\tilde{k}+b) + \alpha_{i,a,b} p_i^{[2]}((b-1)\tilde{k}+a)$$

Note that the constants $\alpha_{i,a,b}$ can be chosen as any element in the field, to satisfy any other desired properties (for example, the MDS property). The only constraint is that $\alpha_{i,a,b} \neq 0$ for all $i, a, b \in \{1, 2, \ldots, \tilde{k}\}$.

Recovery of a Single Failed Systematic Node

Now, when node $x_i$ fails, the recovery pattern depends on whether $i \in \{1, 2, \ldots, \tilde{k}\}$ or if $i \in \{\tilde{k}+1, \tilde{k}+2, \ldots, 2\tilde{k}\}$. First, let $i \in \{1, 2, \ldots, \tilde{k}\}$. On failure of node i, download $x_j((a-1)\tilde{k}+i)$, $p_l((a-1)\tilde{k}+i)$ and $x_m((i-1)\tilde{k}+a)$ for $a=1, 2, \ldots, \tilde{k}$, $l=1, 2, \ldots, \tilde{k}$, $m=\tilde{k}+1, \tilde{k}+2, \ldots, 2\tilde{k}$ and $j=\{1, 2, \ldots, \tilde{k}\} - \{i\}$. With this set of equations, the $x_i$ can be recovered using linear techniques. Now, if $i \in \{\tilde{k}+1, \tilde{k}+2, \ldots, 2\tilde{k}\}$ and node i fails, $x_i$ is to be recovered. This is done by linear decoding, after downloading $x_j((i-1)\tilde{k}+a), p_l((i-1)\tilde{k}+a)$ and $x_m((a-1)\tilde{k}+i)$ for $a=1, 2, \ldots, \tilde{k}$, $l=1, 2, \ldots, \tilde{k}$, $m=\tilde{k}+1, \tilde{k}+2, \ldots, 2\tilde{k}$ and $j=\{1, 2, \ldots, \tilde{k}\} - \{i\}$.

Conclusion

Figure 11:
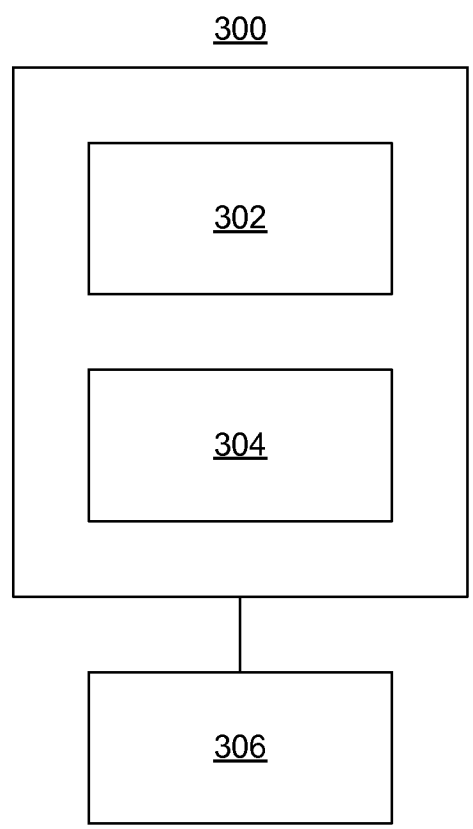
FIG. 11 shows a computing device.

FIG. 11 shows a computing device 300, with which any of the embodiments described above may be implemented. The computing device, for example a server, a workstation, a laptop or handheld device, a "blade", a controller, or the like may have a processor 302 and memory 304. The computing device 300 may also have a display 306. The specific type of computing device 300 is not important to how any embodiments described herein may be implemented.

Embodiments and features discussed above can be realized in the form of information stored in volatile or non-volatile computer or device readable media. This is deemed to include at least media such as optical storage (e.g., compact-disk read-only memory (CD-ROM)), magnetic media, flash read-only memory (ROM), or any current or future means of storing digital information. The stored information can be in the form of machine executable instructions (e.g., compiled executable binary code), source code, bytecode, or any other information that can be used to enable or configure computing devices to perform the various embodiments discussed above. This is also deemed to include at least volatile memory such as random-access memory (RAM) and/or virtual memory storing information such as central processing unit (CPU) instructions during execution of a program carrying out an embodiment, as well as non-volatile media storing information that allows a program or executable to be loaded and executed. The embodiments and features can be performed on any type of computing device, including portable devices, workstations, servers, mobile wireless devices, and so on.

The invention claimed is:

1. A method of recovering data, the method comprising:
maintaining data storage units and parity storage units, where the parity storage units store parity data computed from a group of data stored in the data storage units;
when a storage unit comprising either a first data storage unit or a first parity storage unit becomes unavailable, reading recovery data and using the recovery data to fully recover data that was stored on the unavailable storage unit, wherein the recovery data consists of a portion of data in a combination of the data storage units and the parity storage units excluding the unavailable storage unit, and wherein the amount of data stored by the combination, in aggregate, is less than the amount of data in the group of data; and
transposing two sub-units of parity data.

2. A method according to claim 1, wherein the data storage units and parity storage units comprise respective disk drives.

3. A method according to claim 1, further comprising multiplying one of the sub-units of parity data by an integer.

4. A method according to claim 3, further comprising performing an exclusive-or operation of the two sub-units of parity data with two other sub-units of parity data.

5. A method of recovering data, the method comprising:
maintaining data storage units and parity storage units, where the parity storage units store parity data computed from a group of data stored in the data storage units;
when a storage unit comprising either a first data storage unit or a first parity storage unit becomes unavailable, reading recovery data and using the recovery data to fully recover data that was stored on the unavailable storage unit, wherein the recovery data consists of a portion of data in a combination of the data storage units and the parity storage units excluding the unavailable storage unit, and wherein the amount of data stored by the combination, in aggregate, is less than the amount of data in the group of data, wherein the parity storage units are computed using an (n,k) code, and wherein each data storage unit is divided into (n−k)^k pieces.

6. A method according to claim 5, wherein repair of data of a single data storage unit is capable of being recovered with only 1/(n−k) of pieces of corresponding parity storage units.

7. A method according to claim 6, wherein all of the pieces of the corresponding parity storage units cover the single data storage unit.

8. A method according to claim 7, wherein each data storage unit has a same amount of storage space subjected to the method.

9. One or more computer-readable storage media devices storing information to enable one or more computing devices to perform a process, the process comprising:

maintaining a plurality of nodes comprised of 2k parity nodes and 3k data nodes, wherein each data node consists of k^2 data storage units, and wherein each parity node consists of k^2 parity storage units; and recovering a first data node when the first data node fails or is disabled, the recovering comprising reading no more than k data storage units per data node and/or parity node.

10. One or more computer-readable storage devices according to claim 9, wherein the parity nodes are computed using a combination of a left code and a right code, each comprising a respective (2k, k) code, the computing of the parity nodes further comprising:

constructing the respective (2k, k) codes with minimum repair cost, in which each data node consists of k data storage units, and each parity node consists of k parity storage units; and recovering a first data node failure comprising reading one data storage unit per data node and/or parity node;

dividing each storage unit in the respective (2k,k) codes further into k sub units, whereby each data node and parity node consists of a total of k^2 storage units; and transposing the right code and performing an exclusive-or operation on the storage units of a parity node to form a storage unit in the parity node with a (3k, 2k) code.

11. One or more computer-readable storage devices according to claim 9, wherein given n total storage units, an erasure code has a repair bandwidth of (n−1)/(n−k) storage units for repair of systematic nodes.

12. One or more computer-readable storage devices according to claim 9, wherein, given n total storage units, a parity node is repairable with an amount of k/2+(n−k/2−1)/(n−3k/2) units, where the amount is less than k.

13. One or more computer-readable storage devices according to claim 9, wherein recovering the failed or disabled data node comprises:

reading k data storage units in a parity node that is used by a (2k,k) code, reading k data storage units in a rarity node that is used by the (2k,k) code in a same left/right half, and reading k data storage units in a data node in a different left/right half.

14. One or more computer-readable storage devices according to claim 10, wherein the (3k, 2k) code comprises a Miser-Permutation code.

* * * * *